(12) United States Patent
Robbins

(10) Patent No.: US 8,937,771 B2
(45) Date of Patent: Jan. 20, 2015

(54) THREE PIECE PRISM EYE-PIECE

(71) Applicant: Steve J. Robbins, Bellevue, WA (US)

(72) Inventor: Steve J. Robbins, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 110 days.

(21) Appl. No.: 13/712,626

(22) Filed: Dec. 12, 2012

(65) Prior Publication Data
US 2014/0160576 A1    Jun. 12, 2014

(51) Int. Cl.
*G02B 27/14*    (2006.01)
*G02B 27/01*    (2006.01)

(52) U.S. Cl.
CPC .... *G02B 27/0172* (2013.01); *G02B 2027/0178* (2013.01); *G02B 2027/011* (2013.01)
USPC .......................................... 359/630

(58) Field of Classification Search
CPC ......... G02B 27/01; G02B 27/017; G02B 6/00
USPC .......................................... 359/630
See application file for complete search history.

(56) References Cited

U.S. PATENT DOCUMENTS

| | | | |
|---|---|---|---|
| 4,969,724 A * | 11/1990 | Ellis | ............... 359/364 |
| 5,815,741 A | 9/1998 | Okuyama et al. | |
| 6,185,046 B1 | 2/2001 | Togino | |
| 6,222,677 B1 | 4/2001 | Budd et al. | |
| 6,396,639 B1 | 5/2002 | Togino et al. | |
| 6,457,834 B1 | 10/2002 | Cotton et al. | |
| 6,512,635 B1 | 1/2003 | Takeyama | |
| 2003/0090753 A1 | 5/2003 | Takeyama et al. | |
| 2008/0062538 A1 | 3/2008 | Liao | |
| 2012/0081800 A1 | 4/2012 | Cheng et al. | |

FOREIGN PATENT DOCUMENTS

| | | |
|---|---|---|
| CN | WO2011134169 A1 | 11/2011 |
| EP | 0687932 A2 | 12/1995 |
| JP | 2001013446 A | 1/2001 |

OTHER PUBLICATIONS

"Three Dimensional Microscopy—Imaging 3D Microstructures by Freeform Microoptics", Published on: Aug. 22, 2011, Available at: http://www.imaging-git.com/science/light-microscopy/three-dimensional-microscopy-imaging-3d-microstructures-freeform-microoptic, 3 pages.
"International Search Report & Written Opinion for PCT Application No. PCT/US2013/074452", Mailed Date: Apr. 11, 2014, Filed Date: Dec. 11, 2013 10 pages.

* cited by examiner

*Primary Examiner* — James Jones
(74) *Attorney, Agent, or Firm* — Micah Goldsmith; Judy Yee; Micky Minhas

(57) ABSTRACT

A prism eye piece and optical system including a prism eye piece and microdisplay are described herein. The prism eye piece may include three prisms. A main body prism has a surface that receives light from a source such as a microdisplay. Another prism has a surface that receives light from a source such as the real world. Both of these images are projected through a surface of still another prism that is proximate to an exit pupil. The surface of the prism proximate the exit pupil may be flat. Also the surface of the prism that receives light from a source such as the real world may be flat. These flat surfaces may be parallel to each other. This allows the light from the real world to be transmitted to the exit pupil without distortion.

20 Claims, 14 Drawing Sheets

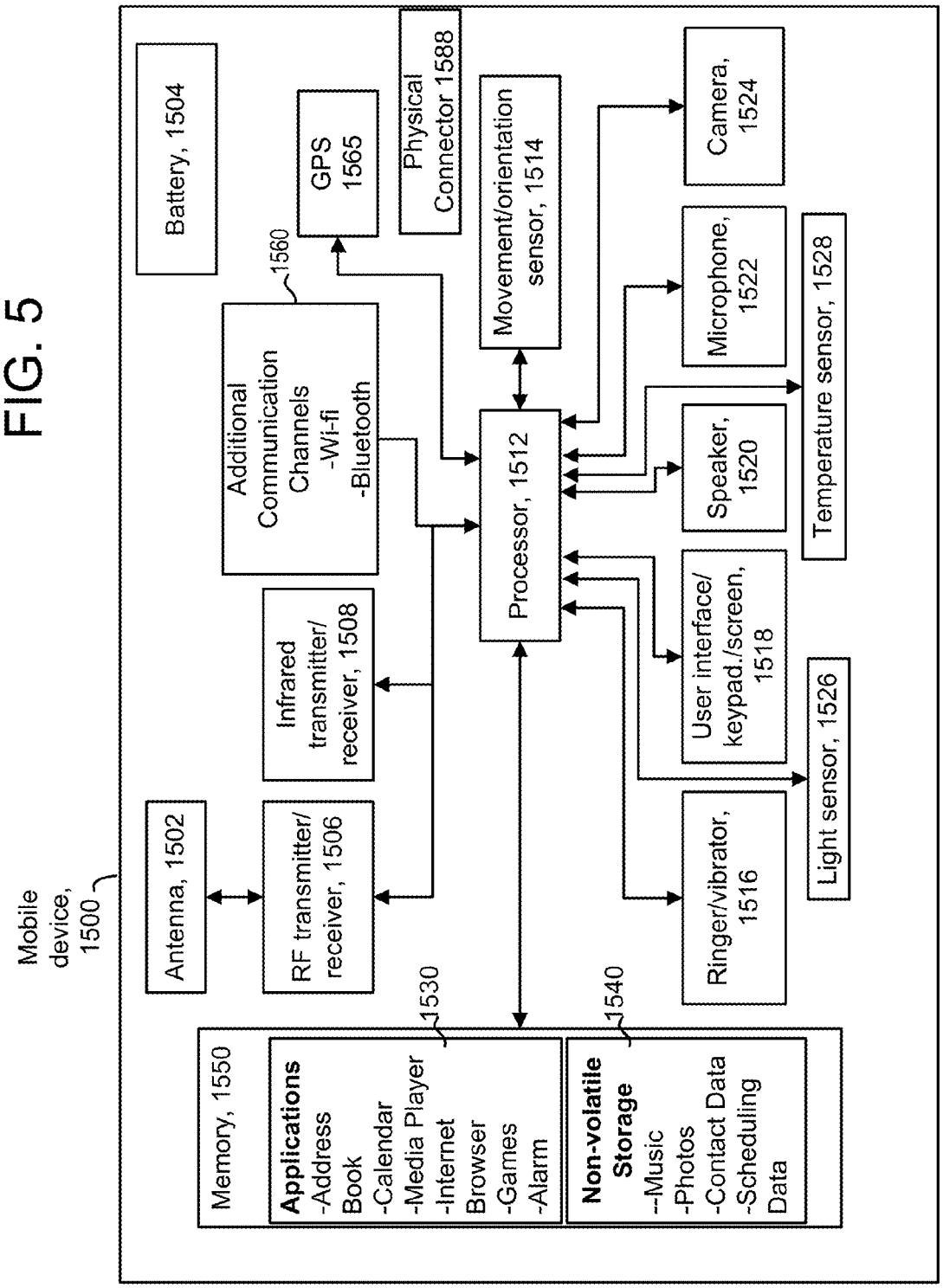

THREE PIECE PRISM EYE-PIECE

BACKGROUND

Mixed reality is a technology that allows virtual imagery to be mixed with a real world physical environment. As one example, a user may wear a head-mounted display (HMD) that includes a microdisplay and an optical system that both projects an image from the microdisplay to the user's eye and allows the user to see the real world.

Constructing such optical systems provides several challenges. One problem is providing a clear and undistorted view of the real world to the user while projecting the image from the microdisplay to the user's eye.

SUMMARY

Technology is described herein which provides various embodiments for an optical system that projects images from two different sources to an exit pupil of the optical system. The optical system includes three prisms in one embodiment. A main body prism has a surface that receives light from a source such as a microdisplay. Another prism has a surface that receives light from a source such as the real world. Both of these images are projected through a surface of still another prism that is proximate the user's eye. The surface of the prism proximate the user's eye is flat. Also the surface of the prism that receives light from a source such as the real world is flat. This allows the light from the real world to be transmitted to the user's eye without distortion.

One embodiment includes an apparatus, comprising a first prism, a second prism, and a correcting plate. The first prism has a first surface, a second surface, and a third surface. The second prism has a first surface proximate the second surface of the first prism. The second prism has a second surface that is flat. There is an air gap between the first surface of the second prism and the second surface of the first prism. The correcting plate has a first surface proximate the third surface of the first prism. The correcting plate has a second surface that is flat. The first prism, the second prism, and the correcting plate are configured such that light that enters the first surface of the first prism is emitted from the second surface of the second prism. The first prism, the second prism, and the correcting plate are configured such that light that enters into the second surface of the correcting plate is emitted from the second surface of the second prism.

One embodiment includes a see through head mounted display apparatus, comprising a microdisplay, a first prism, a second prism, and a third prism. The first prism has a first surface that is configured to receive light from the microdisplay. The first prism also has a second surface and a third surface. The second prism has a first surface configured to receive light from the second surface of the first prism. The second surface of the second prism is configured to transmit light to an exit pupil. The second surface of the second prism is flat. There is an air gap between the first surface of the second prism and the second surface of the first prism. The third prism has a first surface proximate to the third surface of the first prism. The third prism has a second surface that is flat. The flat second surface of the second prism is parallel to the flat first surface of the third prism. The first prism, the second prism, and the third prism are configured to transmit light that enters the second surface of the third prism to the exit pupil. The first prism, the second prism, and the third prism are configured to transmit light from the microdisplay to the exit pupil.

One embodiment includes an optical system comprising a microdisplay, a first prism, a second prism, and a correcting plate. The first prism has a first surface, a second surface, a third surface and a body. At least one of the first surface, the second surface, and the third surface of the first prism is a free form surface. The first prism is configured to receive light from the microdisplay into the first surface. The second prism has a first surface, a second surface, and a body. The second surface of the second prism being proximate to the second surface of the first prism. The second surface of the second prism is flat. The correcting plate has a first surface, a second surface, and a body. The first surface of the correcting plate is proximate to the third surface of the first prism. The second surface of the correcting plate is flat and parallel to the flat second surface of the second prism. Light that enters the first surface of the first prism from the microdisplay is reflected at the second surface of the first prism by total internal reflection, then reflected at the third surface of the first prism, then transmitted out of the second surface of the first prism into an air gap between the first prism and second prism, then into the first surface of the second prism, and then out of the second surface of the second prism. Light that enters the second surface of the correcting plate is transmitted though the body of the correcting plate, through the body of the first prism, into the air gap, through the body of the second prism and out of the second surface of the second prism.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is a block diagram of an exemplary mobile device which may operate in embodiments of the technology described herein.

DETAILED DESCRIPTION

The technology described herein includes a prism eye piece. One embodiment includes an optical system that includes a microdisplay and a prism eye piece. One embodiment includes a head mounted display that includes a microdisplay and a prism eye piece.

The prism eye piece may include three prisms, in one embodiment. A main body prism has a surface that receives light from a source such as a microdisplay. Another prism has a surface that receives light from a source such as the real world. Both of these images are projected through a surface of still another prism that is proximate to the user's eye. The surface of the prism proximate the user's eye may be flat. Also the surface of the prism that receives light from a source such as the real world may be flat. These flat surfaces may be parallel to each other. This allows the light from the real world to be transmitted to the user's eye without distortion.

Figure 1A:
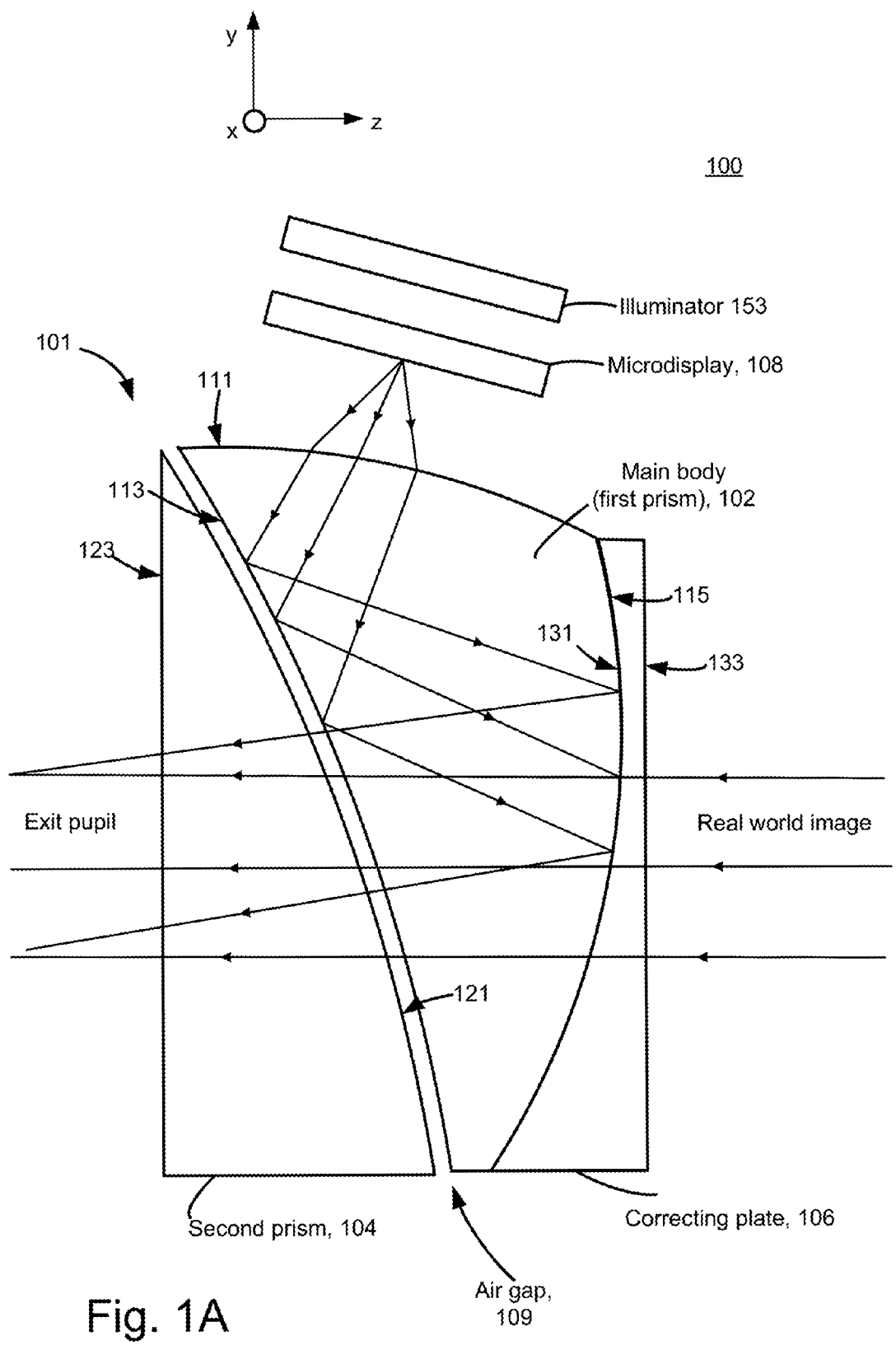
FIG. 1A is a diagram depicting one embodiment of an optical system.

FIG. 1A is a diagram depicting one embodiment of an optical system. This diagram depicts a cross section in the y-z plane. In general, the optical system 100 includes a prism eye piece 101 and a microdisplay 108. The prism eye piece 101 includes three prisms, in one embodiment. There is a main body 102, also referred to as a first prism. There is an internal or second prism 104. There is a correcting plate 106, also referred to as a third prism.

The main body 102 includes numerous surfaces. Three of these surfaces are depicted as lines in the y-z plane represented in FIG. 1A. A first surface 111 is proximate the microdisplay 108 such that it may receive light therefrom. A second surface 113 is depicted proximate the second prism 104. The second surface 113 does not require any special coating. In one embodiment, the second surface 113 of the first prism 102 is a free form surface. In one embodiment, the second surface 113 of the first prism 102 is rotationally symmetric.

A third surface 115 is proximate the correcting plate 106. The third surface 115 may be a collimating surface. The third surface 115 may have a partially reflective coating. As one example, the coating may provide for about 30% reflectivity. This may allow for about 70% transmission of light from the real world to pass through the surface 115. The reflectivity may be higher or lower. In one embodiment, the third surface 115 of the first prism 102 is spherical. In one embodiment, the third surface 115 of the first prism 102 is rotationally symmetric. However, it is not required that this third surface 115 be rotationally symmetric. In one embodiment, the third surface 115 of the first prism 102 is a free form surface.

Each of these three surfaces 111, 113, 115 may be used to correct for optical aberrations in the optical system 100. Thus, there are several degrees of freedom to correct for optical aberrations. For example, off-axis aberrations may be corrected. Each of these three surfaces 111, 113, 115 may be free form or, alternatively, may be rotationally symmetric. Note that one or more of surfaces 111, 113, 115 could be free form, whereas the other(s) of these surfaces could be rotationally symmetric.

The second prism 104 has numerous surfaces. Two of these surfaces are labeled in FIG. 1A. A first surface 121 is proximate the first prism 102. There may be an air gap 109 between the first surface 121 of the second prism 104 and the second surface 113 of the first prism 102. The air gap 109 may be about 1 mm. However, the air gap 109 could be smaller or larger. Note that having a smaller air gap can reduce distortion. The first surface 121 of the second prism may be matched to the second surface 113 of the first prism. The first surface 121 of the second prism 104 may have a shape that depends on the shape of the second surface 113 of the first prism 102. For example, the prescription of these two surfaces 113, 121 may be matched. The combination of having a small air gap and having the same prescriptions can minimize see through distortion. Distortion may be non-zero if the air gap is non-zero. However, at the limit when surface 113 and 121 are coincident, distortion may become zero. In one embodiment, the first surface 121 of the second prism 104 is a free form surface. In one embodiment, the first surface 121 of the second prism 104 is rotationally symmetric.

The second prism 104 also has a second surface 123. In one embodiment, this second surface 123 is flat. For example, it may be a flat plane.

The third prism 106 (or correcting plate) has numerous surfaces. Two of these surfaces are labeled in FIG. 1A. A first surface 131 is proximate the first prism 102. In one embodiment, the first surface 131 of the third prism 106 is conterminous with the third surface 115 of the first prism 102. For example, these two surfaces 115, 131 may be in physical contact with each other. In one embodiment, the first surface 131 of the third prism 106 is a free form surface. In one embodiment, the first surface 131 of the third prism 106 is rotationally symmetric.

The third prism 106 also has a second surface 133. This second surface 133 is flat, in one embodiment. For example, it may be a flat plane. In one embodiment, the flat second surface 123 of the second prism 104 is parallel to the flat second surface 133 of the third prism 106. In one embodiment, the second surface 123 of the second prism 104 is in a first plane, and the second surface 133 of the correcting plate 106 is in a second plane that is parallel to the first plane.

In one embodiment, light from the microdisplay 108 enters the first surface 111 of the first prism 102, where it may be refracted. This light is transmitted through the body of the first prism 102 to the second surface 113 of the first prism 102. This light reflects at the second surface 113 by total internal reflection, in one embodiment. This light may be reflected towards the third surface 115 of the first prism 102. The light may be reflected at the third surface 115 of the first prism 102 back into the body of the first prism 102. Thus, the light may be reflected at the boundary between the first prism 102 and the third prism 106. It is not required that all of the light is reflected back into the body.

Still referring to the light from the microdisplay 108, after being transmitted through the body of the first prism 102, the light leaves the first prism 102 through the second surface 113, travels through the air gap 109, and enters the second prism 104 through the first surface 121 of the second prism 104. After travelling though the body of the second prism 104, the light exits the second surface 123 of the second prism 104. The exit pupil of the optical system 100 is located proximate the second surface 123 of the second prism 104, in one embodiment.

There may be some refraction of the light at the boundary between the second surface 113 of the first prism 102 and the air gap 109. There may also be some refraction of the light at the boundary between the air gap 109 and the first surface 121 of the second prism 104. There may also be some refraction of the light as it exits the second surface 123 of the second prism 104. After exiting the second surface 123 the light may pass through air until it reaches the user's eye.

Next, the transmission of light that is received at the second surface 133 of the third prism 106 will be discussed. The second surface 133 of the third prism 106 receives light from a source, such as a real world image. This light enters the body of the third prism 106. The light may refract at this entrance. After passing through the body of the third prism 106, the light leaves through the first surface 131 of the third prism 106 and enters the main body 102 through its third surface 115. In one embodiment, the index of refraction of the main body 102 is matched to the index of refraction of the correcting plate 106. Therefore, the light does not necessarily refract at the boundary between the first and third prisms.

As previously noted, the third surface 115 of the first prism 102 may have a partially reflective coating. This coating may prevent a small amount of light from the real world image from entering the main body 102. However, the coating can be designed to allow most of the light to enter.

After passing through the body of the first prism 102, the light leaves the first prism 102 through the second surface 113 of the first prism 102, travels through the air gap 109, and enters the second prism 104 through the first surface 121 of the second prism 104. After travelling though the body of the second prism 104 the light exits the second surface 123 of the second prism 104.

The prism eye piece 101 allows the light that enters through the second surface 133 of the third prism 106 to pass through and exit through the second surface 123 of the second prism 104 with very little or no distortion. In one embodiment, the second surface 123 of the second prism 104 is a flat surface in the x-y plane depicted in FIG. 1A. The second surface 133 of the third prism 106 may also be a flat surface in the x-y plane depicted in FIG. 1A. Thus, these two flat surfaces 123, 133 may be parallel to each other. Since these surfaces 123, 133 may be flat and parallel to each other very low or no distortion of the real world image occurs.

FIG. 1A depicts an illuminator 153, which may provide light for the microdisplay 108. Thus, this example is a back lit technology. However, the illuminator 153 could be in the front of the microdisplay 108, or a part of the microdisplay 108. Thus, many technologies can be used to implement microdisplay 108. For example, microdisplay 108 can be implemented using a transmissive projection technology where the light source is modulated by optically active material, backlit with white light. These technologies are usually implemented using LCD type displays with powerful backlights and high optical energy densities. Micro display 108 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 108 can be implemented using an emissive technology where light is generated by the display.

Figure 1B:
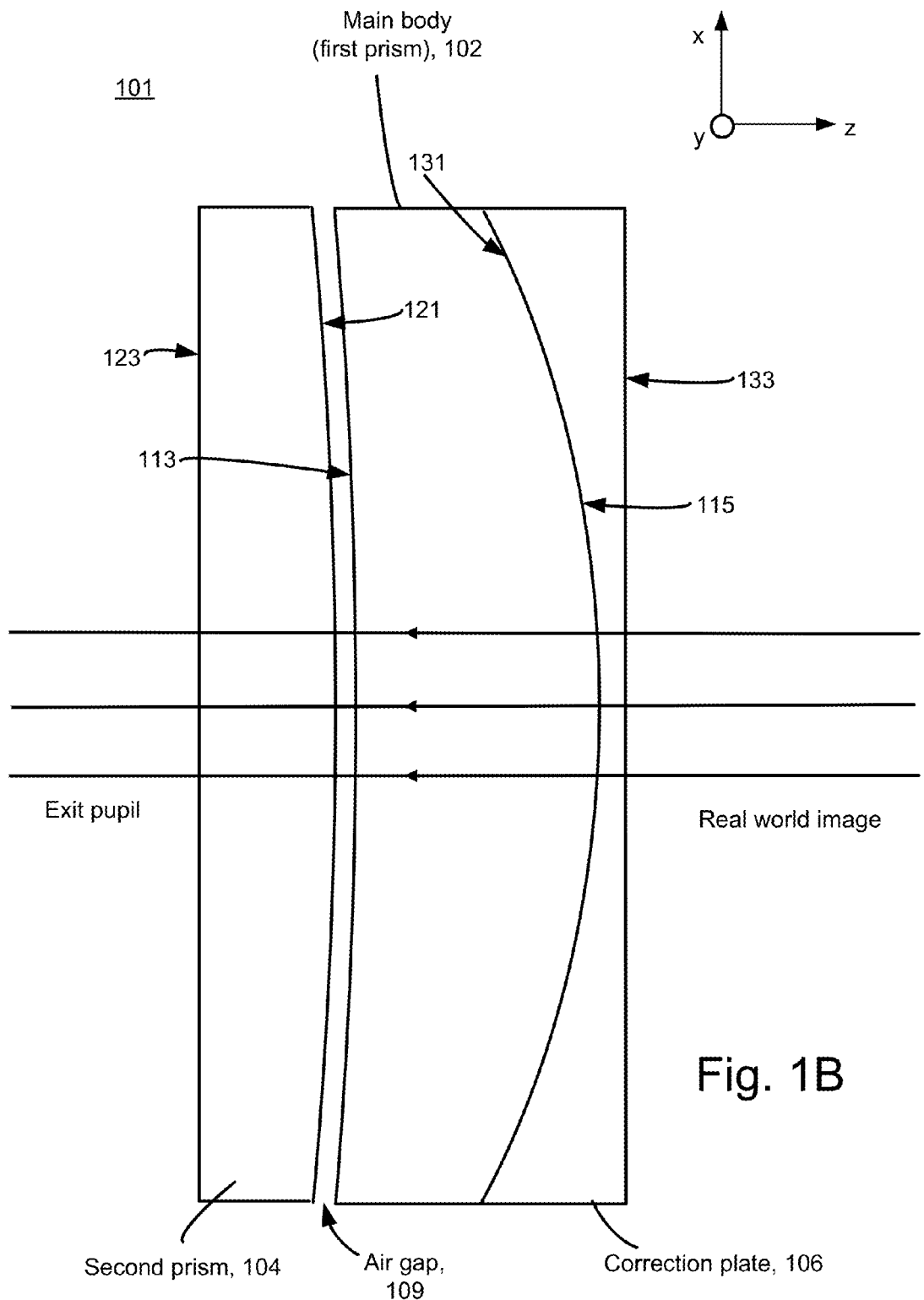
FIG. 1B depicts a cross section of one embodiment of the prism eye piece of FIG. 1A along line A-A'.

FIG. 1B depicts the prism eye piece 101 of FIG. 1A from another perspective. FIG. 1B depicts a slice of the prism eye piece along line A-A'. Thus, this cross sectional slice is in the x-z plane. Note that the microdisplay 108 is not depicted in this view.

As previously discussed, the second surface 123 of the second prism 104 may be flat. Also, the second surface 133 of the third prism 106 may be flat. As previously noted, both of these surfaces 123, 133 may be planes that are parallel to each other. For example, these surfaces 123, 133 could be parallel to the x-y plane represented in FIGS. 1A and 1B.

Referring to FIG. 1B, light from, for example, a real word image, may enter the second surface 113 of the third prism 106 and be transmitted through the bodies of the third prism 106, first prism 102 and second prism 104, respectively, to the exit pupil with little or no optical distortion.

The prism eye piece 100 of one embodiment may have an exit pupil of about 10 mm. The focal length may be about 22 mm. The field of view may be about 60°×36°. Referring to FIG. 1A, the length of the prism eye piece 101 in the z-direction could be about 20 mm. The length of the optical system 100 in the y-direction may be about 40 mm. Note these parameters are used for the sake of illustration, and may be different. All parameters could have higher or lower values.

Figure 1C:
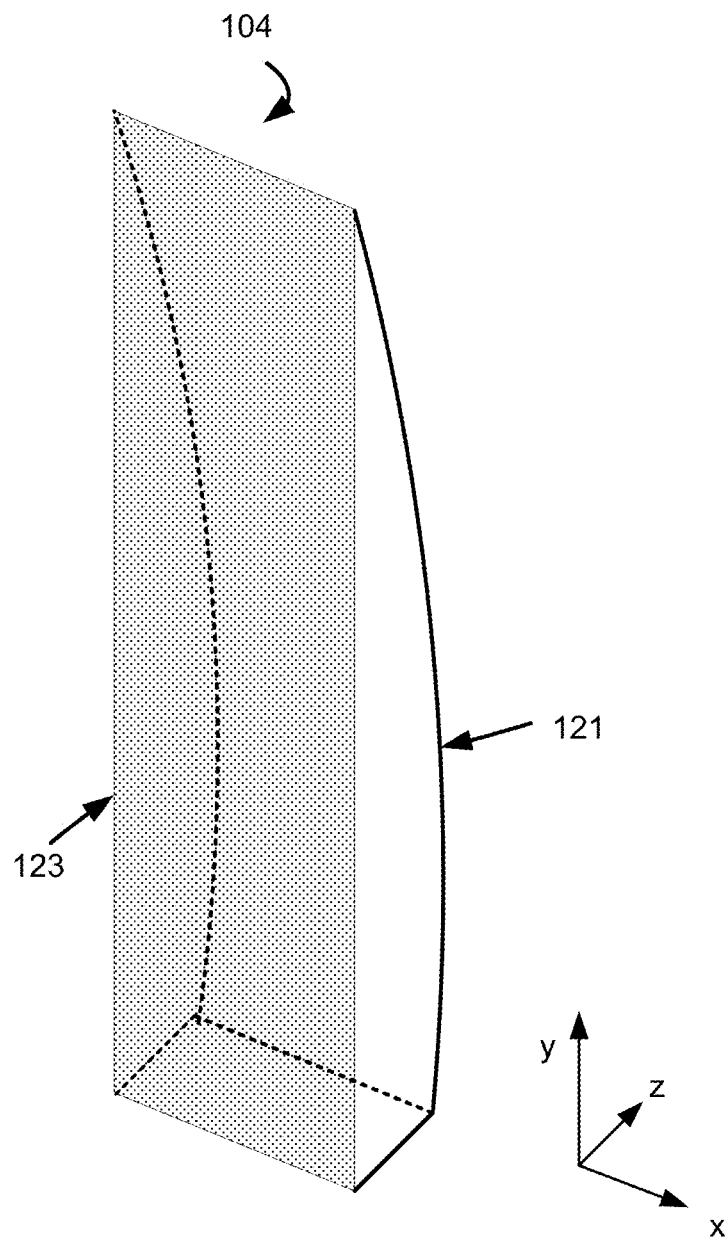
FIG. 1C depicts one embodiment of the second prism from FIG. 1A.

FIG. 1C depicts one embodiment of the second prism 104. The flat, planar shape of the second surface 123 can be seen. In FIG. 1C, this surface is parallel to the xy-plane. The first surface 121 may be a free form surface. However, the first surface could be rotationally symmetric.

Figure 2A:
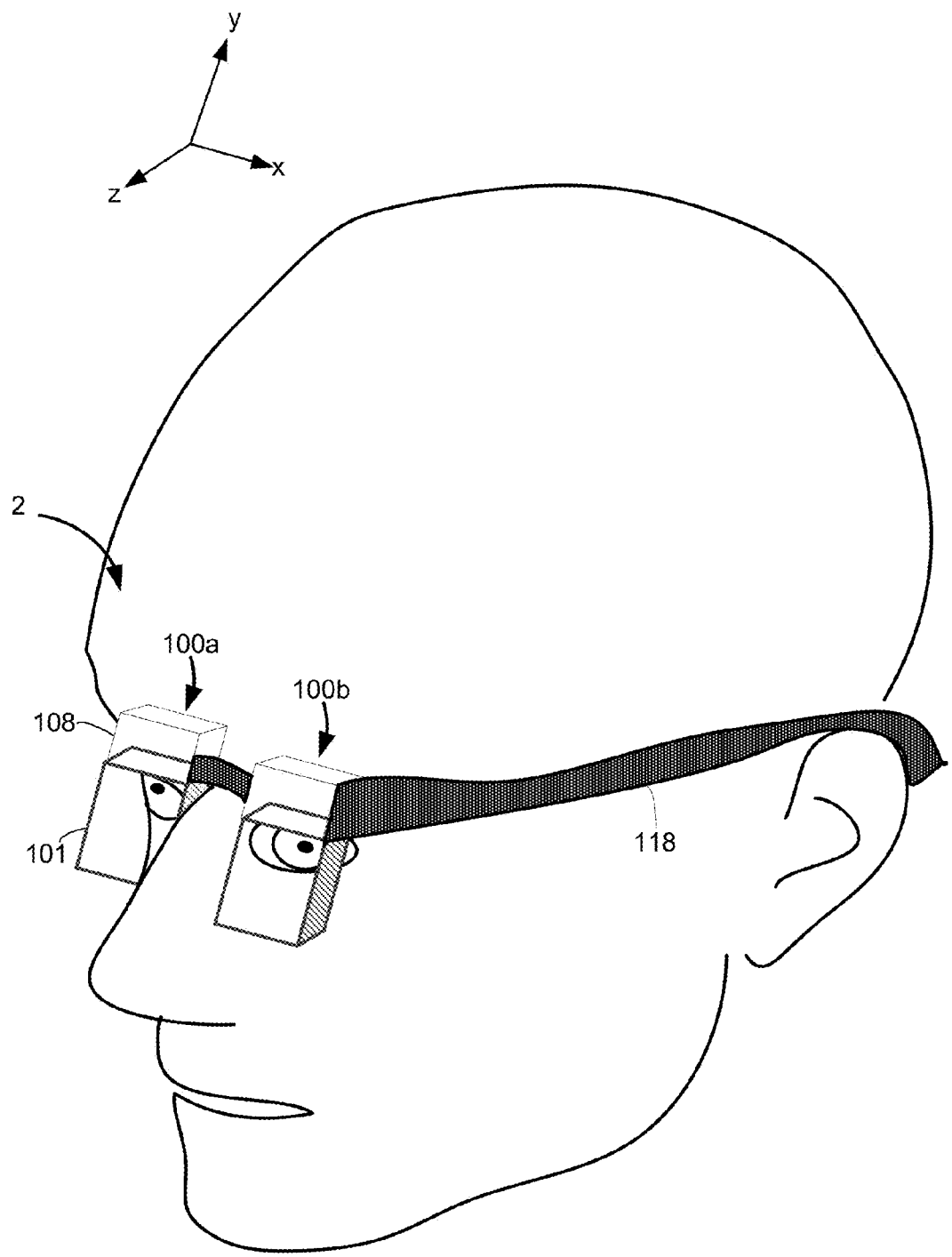
FIG. 2A is a diagram depicting one embodiment of a see through head mounted display (HMD) apparatus being worn by a user.

FIG. 2A is a diagram depicting one embodiment of a see through head mounted display (HMD) apparatus 2 being worn by a user. See through HMD 2, which in one embodiment is in the shape of eyeglasses in a frame 118, is worn on the head of a user so that the user can see through a display, embodied in this example as an optical system 100a, 100b for each eye, and thereby have an actual direct view of the space in front of the user. The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images or holograms, on the microdisplay 108 that are viewable by the person through the prism eye piece 101 while that person is also viewing real world objects through the prism eye piece 101.

The HMD 2 comprises two optical systems 100a, 100b, in this embodiment. Each optical system 100a, 100b includes a prism eye piece 101 and a microdisplay 108. Thus, the HMD 2 has an optical system 100 for each eye in this embodiment. However, as another alternative, there may be a single optical system for both eyes.

Figure 2B:
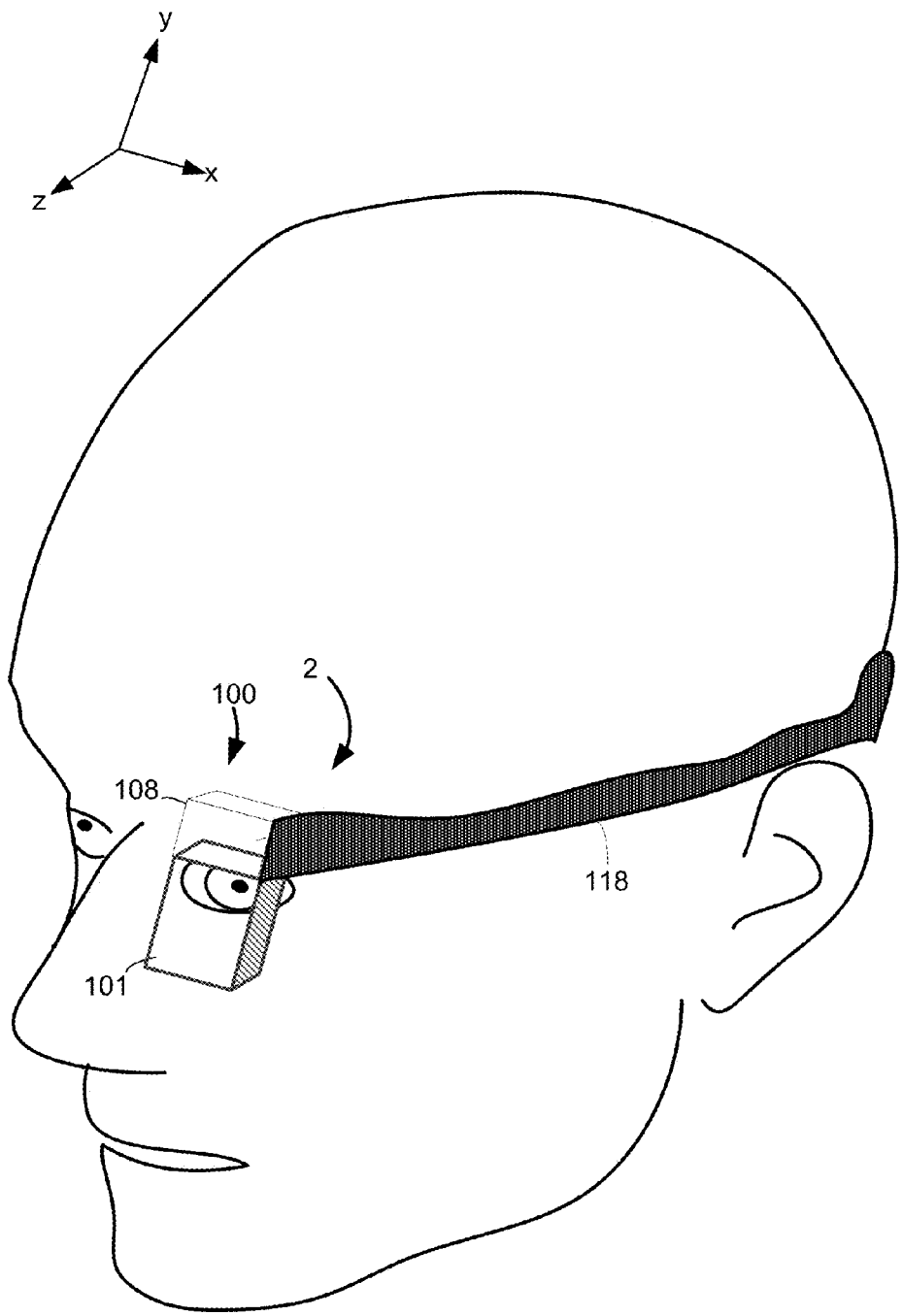
FIG. 2B is a diagram depicting one embodiment of a see through head mounted display (HMD) apparatus having a single optical system.

As still another possibility, the HMD 2 could have a single optical system that is designed to provide an image to just one eye. FIG. 2B is a diagram depicting one embodiment of a see through head mounted display (HMD) apparatus 2 having a single optical system 100 having a microdisplay 108 and prism eye piece 101 that is designed to provide an image to just one eye. In this case, the frame 118 might wrap around the user's head in the back, effectively attaching by fitting to the back half of the user's head, as opposed to being a frame similar to eye glasses.

Figure 2C:
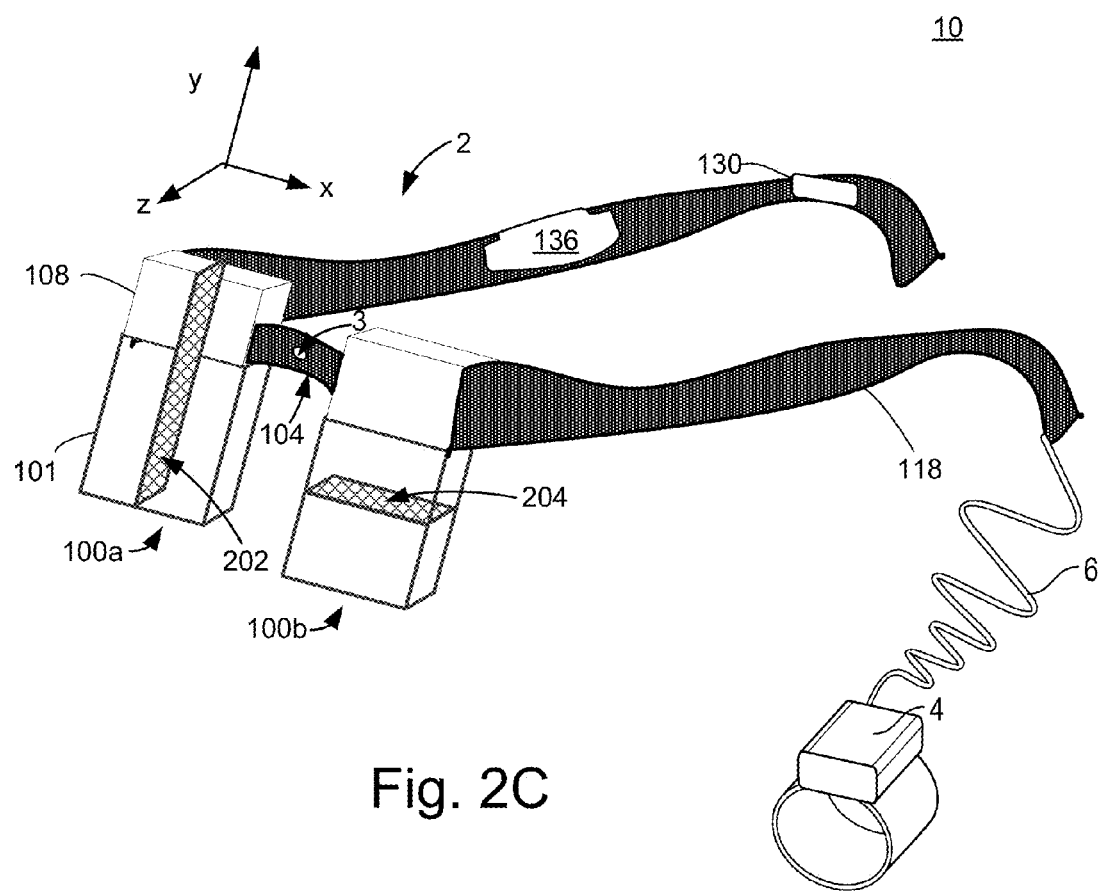
FIG. 2C depicts one embodiment of a system that includes an HMD.

FIG. 2C depicts one embodiment of a system 10 that includes an HMD 2. System 10 includes an HMD in communication with processing unit 4 via wire 6. In other embodiments, HMD 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate see-through, near-eye display device 2. Processing unit 4 may communicate wirelessly (e.g., WiFi, Bluetooth, infra-red, or other wireless communication means) to one or more computing systems, hot spots, cellular data networks, etc. In other embodiments, the functionality of the processing unit 4 may be integrated in software and hardware components of the HMD 2.

The HMD 2 has a first optical system 100a and a second optical system 100b. Each optical system 100 includes a prism eye piece 101 and a microdisplay 108. The optical systems 100a, 100b are connected to a frame 118 of the HMD 2. The frame 118 could include or support various circuitry, such as circuitry 136 and/or ear phones 130.

The optical systems 100 of FIG. 2C may be implemented by the optical system 100 depicted in FIG. 1A. A first plane 202 is depicted as bisecting the prism eye piece 101 and microdisplay 108 of the first optical system 100a. This plane is in the y-z plane. FIG. 1A depicts a cross section of the optical system 100 of FIG. 2C along the first plane 202, in accordance with one embodiment.

A second plane 204 is depicted as bisecting the prism eye piece 101 of the second optical system 100b. This plane is in the x-z plane. FIG. 1B depicts a cross section of the prism eye piece 101 of FIG. 2C along second plane 204, in accordance with one embodiment.

Frame 118 provides a support for holding elements of the system in place as well as a conduit for electrical connections. In one embodiment, frame 118 provides a convenient eyeglass frame as support for the elements of the system discussed further below. In other embodiments, other support structures can be used. An example of such a structure is a visor, hat, helmet or goggles. The frame 118 includes a temple or side arm for resting on each of a user's ears. The frame 118 may include control circuitry 136 for operating the microdisplay 108. Nose bridge 104 of the frame may include a microphone 3 for recording sounds and transmitting audio data to processing unit 4.

Figure 2D:
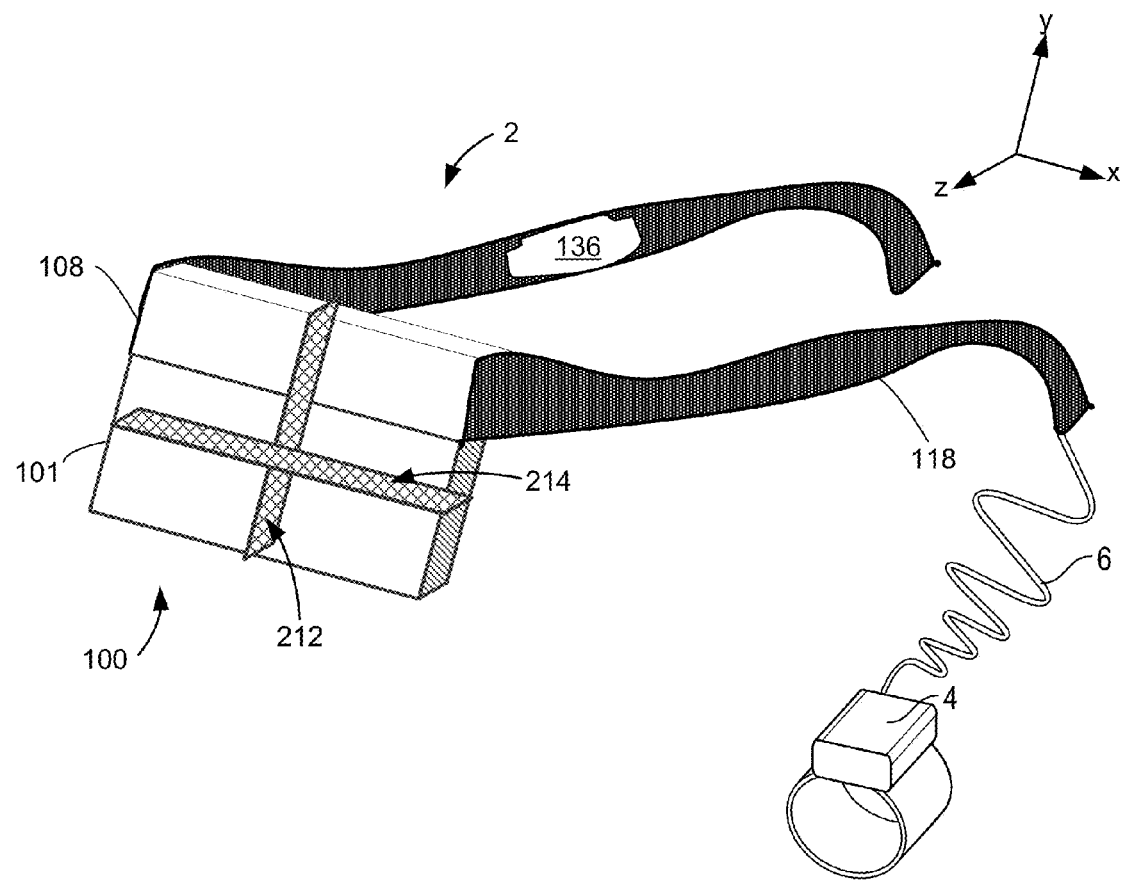
FIG. 2D depicts one embodiment of a system that includes an HMD that has a single optical system that provides an image for both eyes.

FIG. 2D depicts one embodiment of a system having an HMD 2. The HMD 2 has a single optical system 100 that provides an image for both eyes. The optical system 100 may include a single prism eye piece 101 and a single microdisplay 108. The optical system 100 is connected to a frame 118 of the HMD 2.

The optical system 100 of FIG. 2D may be implemented by the optical system 100 depicted in FIG. 1A. A plane 212 is depicted as bisecting the prism eye piece 101 and microdisplay 108 of the optical system 100. This plane is in the y-z plane. FIG. 1A depicts one embodiment of the optical system 100 of FIG. 2D along the cross section of first plane 212.

Another plane 214 is depicted as bisecting the prism eye piece 101 of the optical system 100. This plane is in the x-z plane. FIG. 1B depicts one embodiment of the prism eye piece 101 of FIG. 2D along the cross section of this plane 214.

Figure 3A:
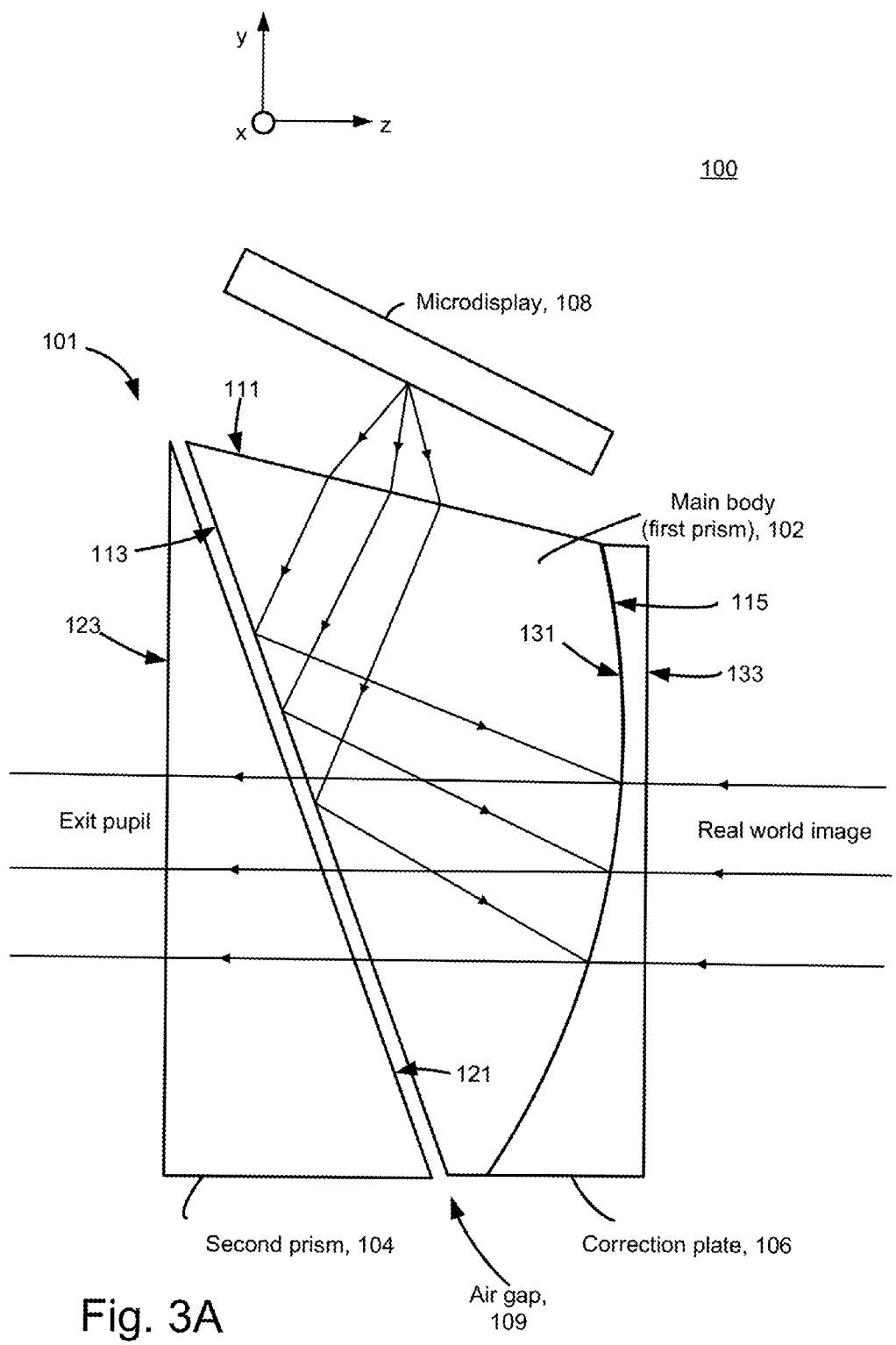
FIG. 3A depicts one embodiment of an optical system.

FIG. 3A depicts one embodiment of an optical system 100 having a prism eye piece 101 and a microdisplay 108. This diagram depicts a cross section in the y-z plane. This embodiment is similar to the embodiment of FIGS. 1A and 1B in some respects. For example, it has a three piece prism eye piece 101 having a main body 102 (or first prism), a second prism 104 and a correcting plate 106 (or third prism). As noted above, the surfaces of the first prism 102 can take on many different shapes. In this embodiment, the first surface 111 and the second surface 113 of the main body 102 are straight lines in the y-z plane.

Figure 3B:
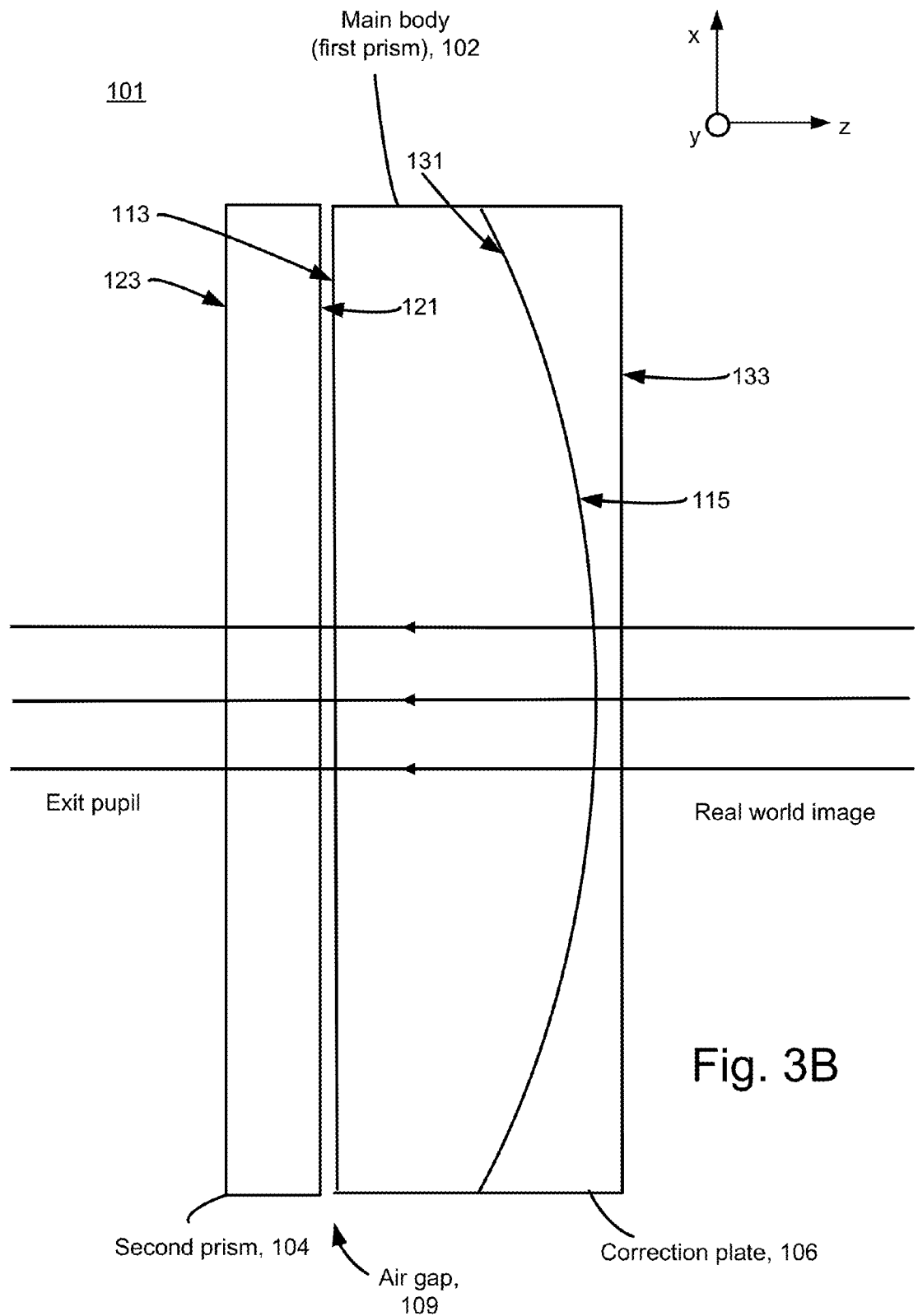
FIG. 3B depicts one embodiment of a prism eye piece.

FIG. 3B depicts one embodiment of an optical system 100 having a prism eye piece 101 and a microdisplay 108. This diagram depicts a cross section in the x-z plane. This embodiment is similar to the embodiment of FIGS. 1A and 1B in some respects. For example, it has a three piece prism eye piece 101 having a main body 102 (or first prism), a second prism 104 and a correcting plate 106 (or third prism). In this embodiment, the second surface 113 of the main body 102 is a straight line in the x-z plane.

In one embodiment, the configuration of FIG. 3B is combined with the configuration of FIG. 3A. In such an embodiment, the second surface 113 of the main body 102 may be a flat plane. In one embodiment, the first surface 111 of the main body is a flat plane. While flat planes may simplify the design, they may provide fewer degrees of freedom for correcting aberrations.

Figure 3C:
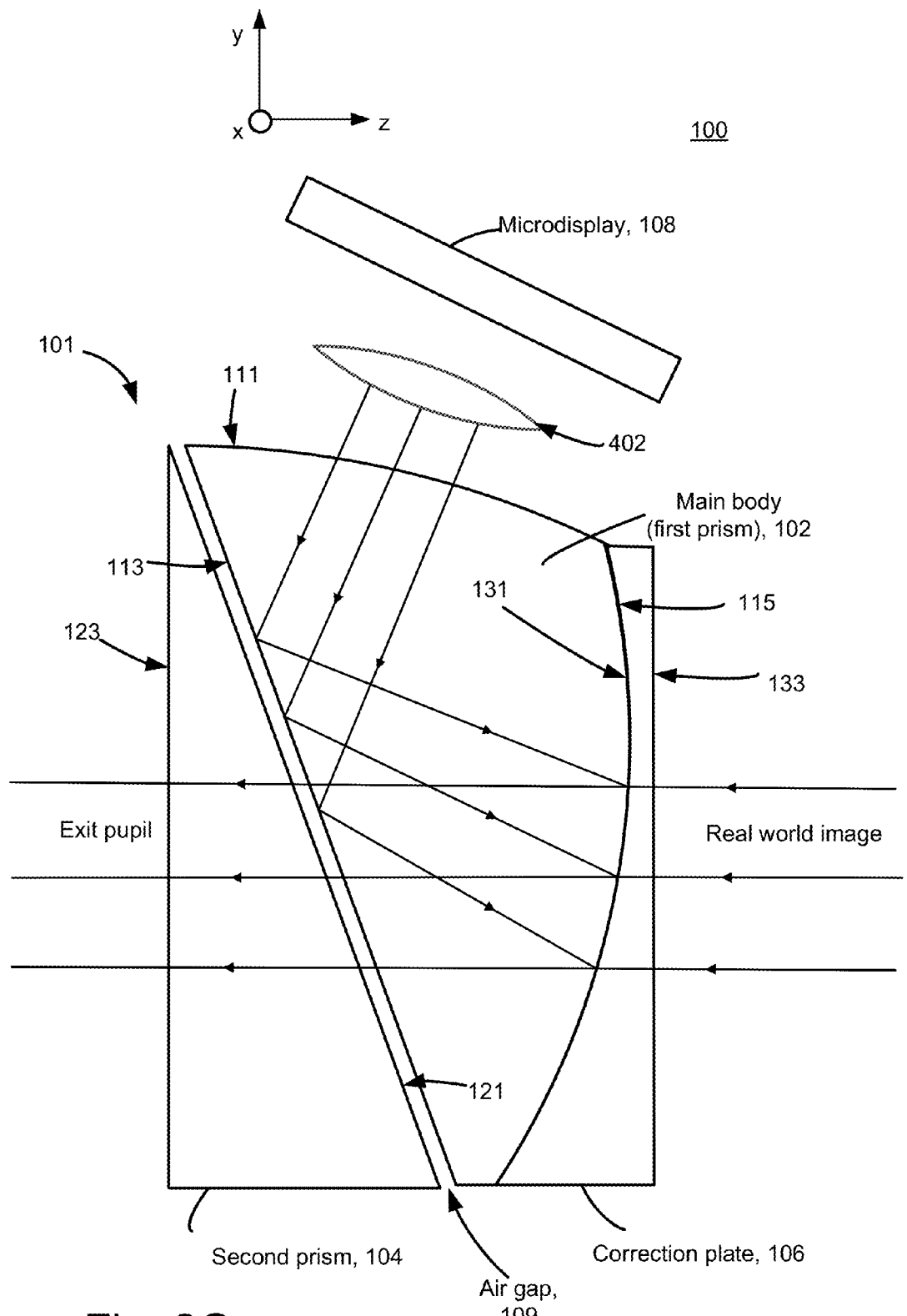
FIG. 3C depicts one embodiment of an optical system.

FIG. 3C depicts another embodiment of the optical system 100. This embodiment is similar to the embodiment of FIGS. 1A and 1B in some respects. For example, it has a three piece prism eye piece 101 having a main body 102 (or first prism), a second prism 104 and a correcting plate 106 (or third prism). However, there is a lens 402 between the microdisplay 108 and the main body 102. The lens 402 may be a convex lens, as depicted in FIG. 3C, but is not required to be convex. The lens 402 may provide another degree of freedom for correcting distortion. In one embodiment, the lens 402 is a free form lens. For example, the lens 402 may be aspheric. However, the lens 402 could be rotationally symmetric. The various surfaces (e.g., 111, 113, 115) of the main body may be free form, rotationally symmetric, etc. Likewise, the first surface 121 of the second prism 104 and the first surface of the third prism 106 may be free form, rotationally symmetric, etc.

Figure 4A:
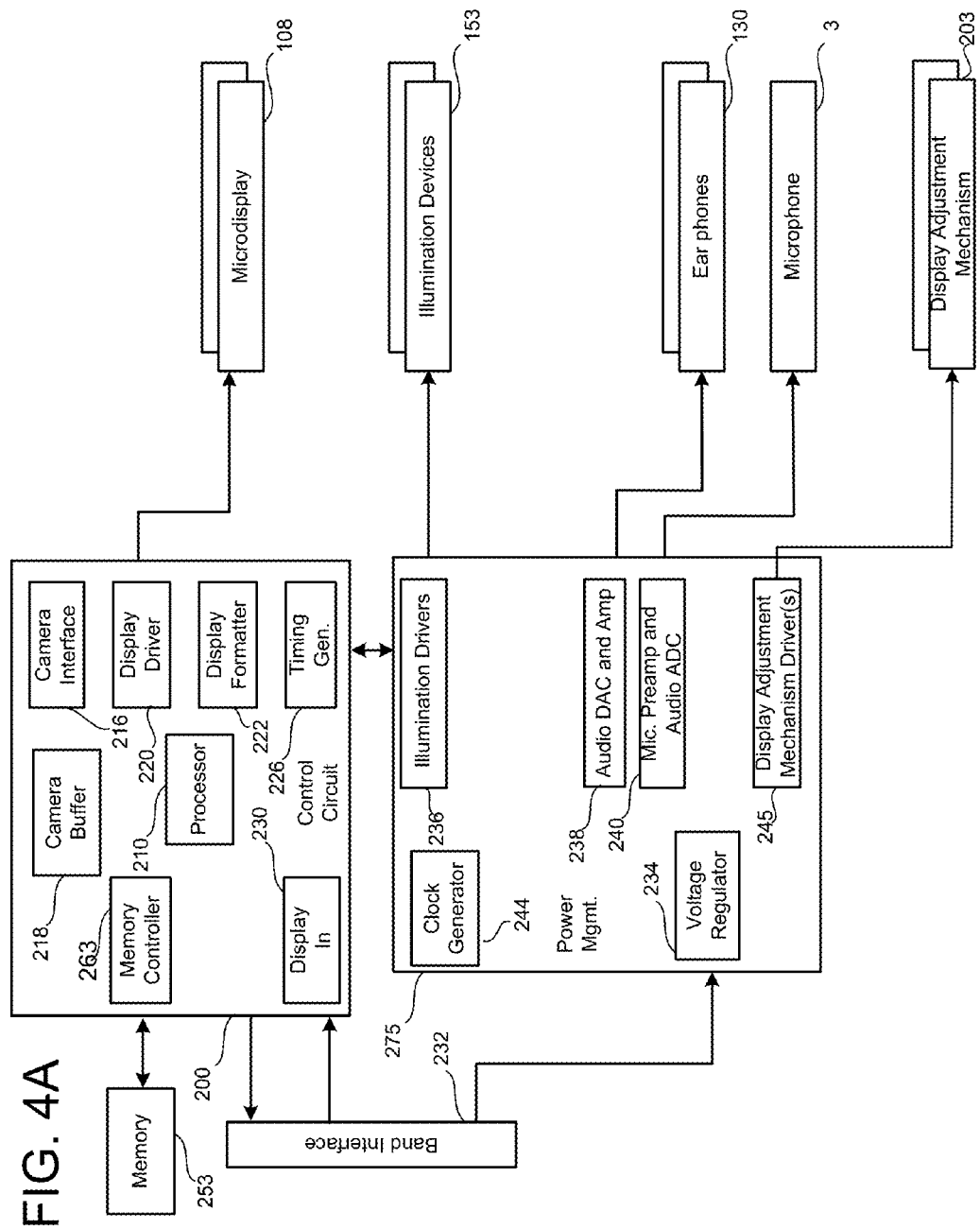
FIG. 4A is a block diagram of one embodiment of hardware and software components of a see-through, near-eye, mixed reality display unit.
Figure 4B:
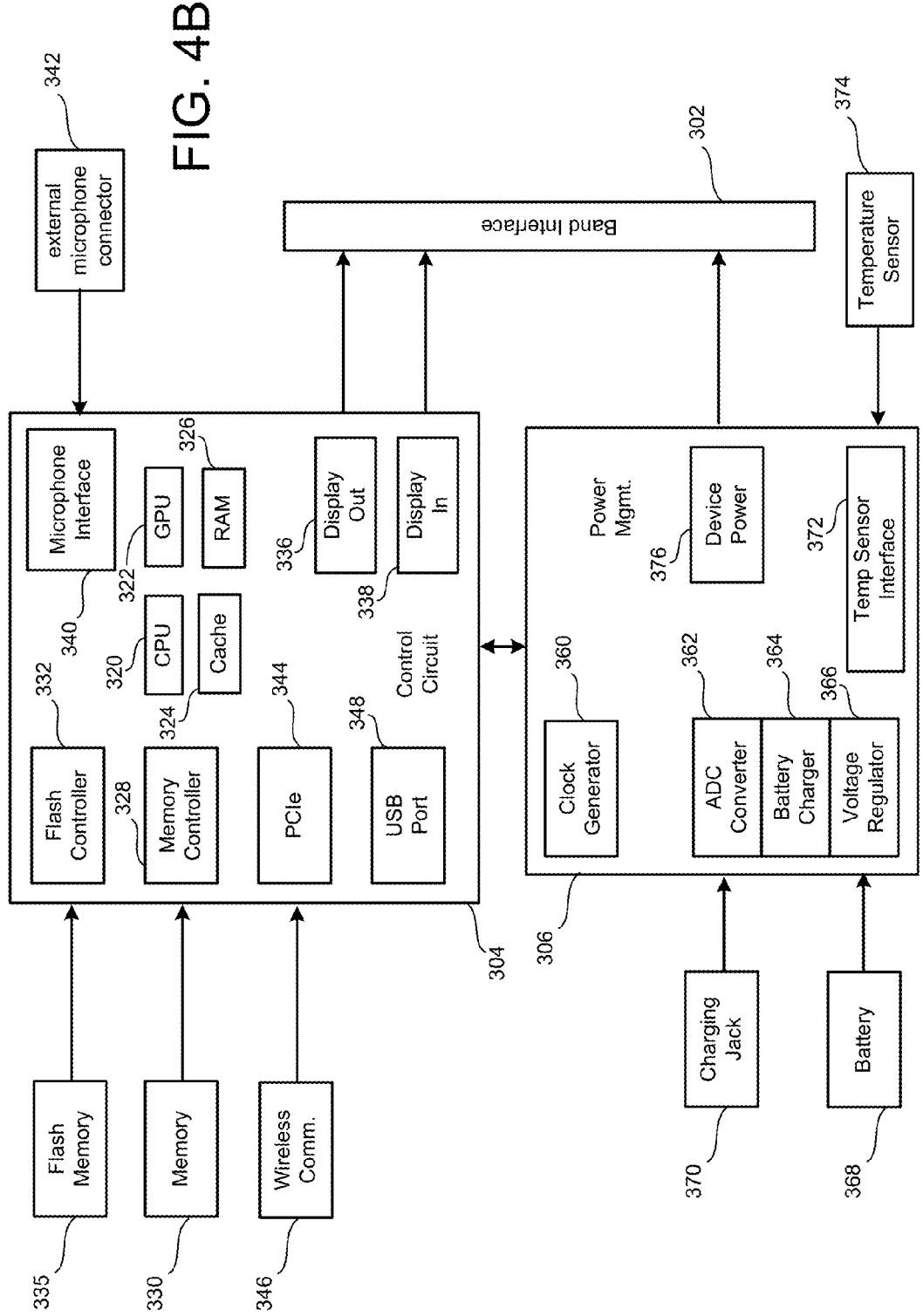
FIG. 4B is a block diagram of one embodiment of the hardware and software components of a processing unit associated with a see-through, near-eye, mixed reality display unit.

FIG. 4A is a block diagram of one embodiment of hardware and software components of a see-through, near-eye, mixed reality display unit 2 as may be used with one or more embodiments. FIG. 4B is a block diagram describing the various components of a processing unit 4. In this embodiment, see-through, near-eye display device 2, receives instructions about a virtual image from processing unit 4 and provides the sensor information back to processing unit 4. Software and hardware components which may be embodied in a processing unit 4 are depicted in FIG. 4B, will receive the sensory information from the HMD 2. Based on that information, processing unit 4 will determine where and when to provide a virtual image to the user and send instructions accordingly to the control circuitry 136 of the HMD 2.

Note that some of the components of FIG. 4A (e.g., microdisplay 108, illuminators 153, earphones 130, display adjustment mechanism 203) are shown in shadow to indicate that there are at least two of each of those devices, at least one for the left side and at least one for the right side of HMD 2. FIG. 4A shows the control circuit 200 in communication with the power management unit 275. Control circuit 200 includes processor 210, memory controller 263 in communication with memory 253 (e.g., D-RAM), camera interface 216, camera buffer 218, display driver 220, display formatter 222, timing generator 226, display out 228, and display in interface 230. In one embodiment, all of components of driver 220 are in communication with each other via dedicated lines of one or more buses. In another embodiment, each of the components of control circuit 200 is in communication with processor 210.

Display driver 220 will drive microdisplay 108. Display formatter 222 may provide information, about the virtual image being displayed on microdisplay 108 to one or more processors of one or more computer systems, e.g. 4, 210 performing processing for the augmented reality system. Timing generator 226 is used to provide timing data for the system. Display in 230 is a buffer for receiving images such as a virtual image to be displayed on microdisplay 108. Display in 230 communicates with band interface 232 which is an interface to processing unit 4.

Power management unit 275 includes voltage regulator 234, audio DAC and amplifier 238, microphone preamplifier and audio ADC 240, display adjustment mechanism driver(s) 245 and clock generator 244. Voltage regulator 234 receives power from processing unit 4 via band interface 232 and provides that power to the other components of HMD 2. Illumination driver 236 controls, for example via a drive current or voltage, the illuminators 153 to operate about a predetermined wavelength or within a wavelength range. Audio DAC and amplifier 238 provide the audio information to earphones 130. Microphone preamplifier and audio ADC 240 provide an interface for microphone 3.

FIG. 4B is a block diagram of one embodiment of the hardware and software components of a processing unit 4 associated with a see-through, near-eye, mixed reality display unit. The processing unit 4 may include this embodiment of hardware and software components as well as similar components which perform similar functions. FIG. 4B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 335 (or other type of non-volatile storage), display out buffer 336 in communication with see-through, near-eye display device 2 via band interface 302 and band interface 232, display in buffer 338 in communication with see-through, near-eye display device 2 via band interface 302, microphone interface 340 in communication with an external microphone connector 342 for connecting to a microphone, PCI express interface for connecting to a wireless communication component 346, and USB port(s) 348.

In one embodiment, wireless communication component 346 can include a Wi-Fi enabled communication device, Bluetooth communication device, infrared communication device, etc. The USB port can be used to dock the processing unit 4 to a secondary computing device in order to load data or software onto processing unit 4, as well as to charge processing unit 4. In one embodiment, CPU 320 and GPU 322 are the main workhorses for determining where, when and how to insert images into the view of the user.

Power management circuit 306 includes clock generator 360, analog to digital converter 362, battery charger 364, voltage regulator 366, see-through, near-eye display power interface 376, and temperature sensor interface 372 in communication with temperature sensor 374 (e.g., located on the wrist band of processing unit 4). An alternating current to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the HMD 2.

The system described above can be used to add virtual images to a user's view such that the virtual images are mixed with real images that the user see. In one example, the virtual images are added in a manner such that they appear to be part of the original scene.

FIG. 5 is a block diagram of an exemplary mobile device which may operate in embodiments of the technology described herein (e.g. processing unit 4). Exemplary electronic circuitry of a typical mobile phone is depicted. The device 1500 includes one or more microprocessors 1512, and memory 1510 (e.g., non-volatile memory such as ROM and volatile memory such as RAM) which stores processor-readable code which is executed by one or more processors of the control processor 1512 to implement the functionality described herein.

Mobile device 1500 may include, for example, processors 1512, memory 1550 including applications and non-volatile storage. The processor 1512 can implement communications, as well as any number of applications, including the interaction applications discussed herein. Memory 1550 can be any variety of memory storage media types, including non-volatile and volatile memory. A device operating system handles the different operations of the mobile device 1500 and may contain user interfaces for operations, such as placing and receiving phone calls, text messaging, checking voicemail, and the like. The applications 1530 can be any assortment of programs, such as a camera application for photos and/or videos, an address book, a calendar application, a media player, an Internet browser, games, other multimedia applications, an alarm application, other third party applications, the interaction application discussed herein, and the like. The non-volatile storage component 1540 in memory 1510 contains data such as web caches, music, photos, contact data, scheduling data, and other files.

The processor 1512 also communicates with RF transmit/receive circuitry 1506 which in turn is coupled to an antenna 1502, with an infrared transmitted/receiver 1508, with any additional communication channels 1560 like Wi-Fi or Bluetooth, and with a movement/orientation sensor 1514 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 1512 further communicates with a ringer/vibrator 1516, a user interface keypad/screen, biometric sensor system 1518, a speaker 1520, a microphone 1522, a camera 1524, a light sensor 1526 and a temperature sensor 1528.

The processor 1512 controls transmission and reception of wireless signals. During a transmission mode, the processor 1512 provides a voice signal from microphone 1522, or other data signal, to the RF transmit/receive circuitry 1506. The transmit/receive circuitry 1506 transmits the signal to a remote station (e.g., a fixed station, operator, other cellular phones, etc.) for communication through the antenna 1502. The ringer/vibrator 1516 is used to signal an incoming call, text message, calendar reminder, alarm clock reminder, or other notification to the user. During a receiving mode, the transmit/receive circuitry 1506 receives a voice or other data signal from a remote station through the antenna 1502. A received voice signal is provided to the speaker 1520 while other received data signals are also processed appropriately.

Additionally, a physical connector 1588 can be used to connect the mobile device 1500 to an external power source, such as an AC adapter or powered docking station. The physical connector 1588 can also be used as a data connection to a computing device. The data connection allows for operations such as synchronizing mobile device data with the computing data on another device.

A GPS transceiver 1565 utilizing satellite-based radio navigation to relay the position of the user applications is enabled for such service.

The example computer systems illustrated in the Figures include examples of computer readable storage media. Computer readable storage media include computer readable storage devices. These may be hardware devices. Computer readable storage media are also processor readable storage media. Such media may include volatile and nonvolatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

Figure 6:
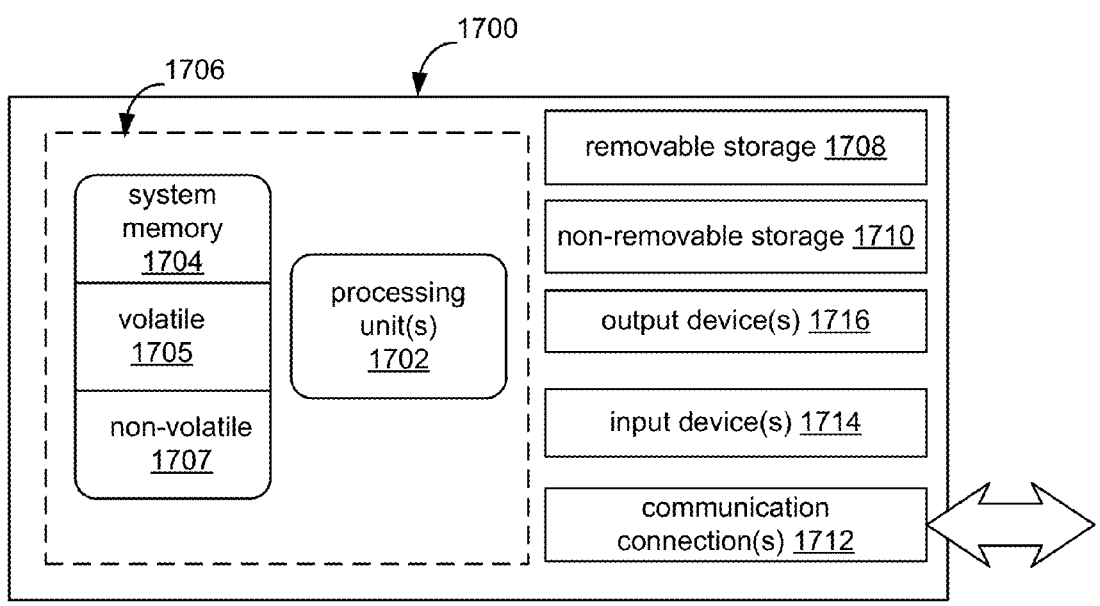
FIG. 6 is a block diagram of another exemplary processing device.

FIG. 6 is a block diagram of one embodiment of a computing system that can be used to implement one or more network accessible computing systems 12 or a processing unit 4. With reference to FIG. 6, an exemplary system includes a computing device, such as computing device 1700. In its most basic configuration, computing device 1700 typically includes one or more processing units 1702 including one or more central processing units (CPU) and one or more graphics processing units (GPU). Computing device 1700 also includes memory 1704. Depending on the exact configuration and type of computing device, memory 1704 may include volatile memory 1705 (such as RAM), non-volatile memory 1707 (such as ROM, flash memory, etc.) or some combination of the two. This most basic configuration is illustrated in FIG. 17 by dashed line 1706. Additionally, device 1700 may also have additional features/functionality. For example, device 1700 may also include additional storage (removable and/or non-removable) including, but not limited to, magnetic or optical disks or tape. Such additional storage is illustrated in FIG. 16 by removable storage 1708 and non-removable storage 1710.

Device 1700 may also contain communications connection(s) 1712 such as one or more network interfaces and transceivers that allow the device to communicate with other devices. Device 1700 may also have input device(s) 1714 such as keyboard, mouse, pen, voice input device, touch input device, etc. Output device(s) 1716 such as a display, speakers, printer, etc. may also be included. All these devices are well known in the art and are not discussed at length here.

The example computer systems illustrated in the figures include examples of computer readable storage devices. A computer readable storage device is also a processor readable storage device. Such devices may include volatile and non-volatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a three piece prism eyepiece comprising a first prism, a second prism, and a correcting plate;
the first prism having a first surface that is positioned to receive light from outside of the three piece prism eyepiece, the first prism having a second surface and a third surface, wherein at least one of the surfaces of the first prism is a free form surface;
the second prism having a first surface proximate to the second surface of the first prism and having a second surface, the second surface of the second prism being flat, there being an air gap between the first surface of the second prism and the second surface of the first prism; and
the correcting plate having a first surface proximate the third surface of the first prism, the correcting plate having a second surface that is flat, wherein the second surface of the second prism is in a first plane, wherein the second surface of the correcting plate is in a second plane that is parallel to the first plane, wherein the second surface of the correcting plate being configured to receive light from outside of the three piece prism eyepiece;
the first prism, the second prism, and the correcting plate are configured such that light that enters the first surface of the first prism from outside of the three piece prism eyepiece is emitted from the second surface of the second prism externally of the three piece prism eyepiece;
the first prism, the second prism, and the correcting plate are configured such that light that enters from outside of the three piece prism eyepiece into the second surface of the correcting plate is emitted from the second surface of the second prism externally from the three piece prism eyepiece.

2. The apparatus of claim 1, further comprising a microdisplay, the first surface of the first prism is configured to receive light from the microdisplay.

3. The apparatus of claim 2, wherein the first prism, the second prism, and the correcting plate are configured such that the light that enters the first surface of the first prism from the microdisplay is reflected at the second surface of the first prism by total internal reflection, then reflected at the third surface of the first prism, then transmitted out of the second surface of the first prism into the air gap, then into the first surface of the second prism, and then out of the second surface of the second prism.

4. The apparatus of claim 1, wherein a refracting index of the correcting plate is matched to a refracted index of the first prism.

5. The apparatus of claim 1, wherein the third surface of the first prism is rotationally symmetric.

6. A see through head mounted display apparatus, comprising:
a microdisplay;
a first prism having a first surface configured to receive light from the microdisplay, the first prism having a second surface and a third surface, wherein at least one of the second surface or the third surface of the first prism is a free form surface;
a second prism having a first surface configured to receive light from the second surface of the first prism, the second surface of the second prism configured to transmit light to an exit pupil, the second surface being flat, there being an air gap between the first surface of the second prism and the second surface of the first prism; and a third prism having a first surface proximate to the third surface of the first prism, the third prism having a second surface that is flat, the flat second surface of the second prism is parallel to the flat second surface of the third prism, the first prism, the second prism, and the third prism are configured to transmit light that enters the second surface of the third prism from outside of the see through head mounted display apparatus to the exit pupil;

the first prism, the second prism, and the third prism are configured to transmit light from the microdisplay to the exit pupil.

7. The see through head mounted display apparatus of claim 6, wherein the microdisplay is one of a transmissive display, a reflective display, or an emissive display.

8. The see through head mounted display apparatus of claim 6, wherein the first prism, the second prism, and the third prism are a first set of prisms that provide light to a first eye of a user that wears the apparatus, and further comprising a second set of a first prism, a second prism, and a third prism that provide light to a second eye of the user.

9. The see through head mounted display apparatus of claim 6, wherein a prescription of the first surface of the second prism is matched to a prescription of the second surface of the first prism.

10. The see through head mounted display apparatus of claim 6, further comprising an aspherical lens between the microdisplay and the first surface of the first prism.

11. The see through head mounted display apparatus of claim 6, wherein the first surface of the third prism is in physical contact with the third surface of the first prism.

12. The see through head mounted display apparatus of claim 6, further comprising:
a processing device in communication with the microdisplay, the processing device provides an image to the microdisplay.

13. An optical system comprising:
a microdisplay;
a first prism having a first surface, a second surface, a third surface and a body, the first prism configured to receive light from the microdisplay into the first surface, wherein the second surface is a free form surface;
a second prism having a first surface, a second surface, and a body, the second surface of the second prism being proximate to the second surface of the first prism, the second surface of the second prism being flat, the first surface of the second prism being a free form surface; and
a correcting plate having a first surface, a second surface, and a body, the first surface of the correcting plate being proximate to the third surface of the first prism, the second surface of the correcting plate being flat and parallel to the flat second surface of the second prism;
light that enters the first surface of the first prism from the microdisplay is reflected at the second surface of the first prism by total internal reflection, then reflected at the third surface of the first prism, then transmitted out of the second surface of the first prism into an air gap between the first prism and second prism, then into the first surface of the second prism, and then out of the second surface of the second prism;
light that enters the second surface of the correcting plate is transmitted though the body of the correcting plate, through the body of the first prism, into the air gap, through the body of the second prism and out of the second surface of the second prism.

14. The optical system of claim 13, wherein the first prism has a first index of refraction, the correcting plate has a second index of refraction that is equal to the first index of refraction.

15. The optical system of claim 13, wherein the second surface of the first prism is a free form surface.

16. The optical system of claim 13, wherein the third surface of the first prism includes a partially reflective coating.

17. The optical system of claim 13, wherein the first surface of the correcting plate is conterminous with the third surface of the first prism.

18. The apparatus of claim 1, wherein the second surface of the first prism is a free form surface.

19. The apparatus of claim 1, wherein the second surface and the third surface of the first prism are each a free form surface.

20. The apparatus of claim 1, wherein the first surface, the second surface and the third surface of the first prism are each a free form surface.

* * * * *